(12) United States Patent
Park et al.

(10) Patent No.: US 9,630,613 B2
(45) Date of Patent: Apr. 25, 2017

(54) APPARATUS AND METHOD FOR CONTROLLING ENGINE CLUTCH OF HYBRID VEHICLE

(71) Applicants: Hyundai Motor Company, Seoul (KR); Kia Motors Corporation, Seoul (KR)

(72) Inventors: Il Kwon Park, Seoul (KR); Kwon Chae Chung, Seoul (KR); Hoon Han, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/931,710

(22) Filed: Nov. 3, 2015

(65) Prior Publication Data

US 2016/0368470 A1    Dec. 22, 2016

(30) Foreign Application Priority Data

Jun. 16, 2015  (KR) .................. 10-2015-0084848

(51) Int. Cl.
  *B60K 6/387*   (2007.10)
  *B60W 20/10*   (2016.01)
  (Continued)

(52) U.S. Cl.
  CPC ............. *B60W 20/10* (2013.01); *B60K 6/387* (2013.01); *B60K 6/442* (2013.01); *B60W 10/02* (2013.01); *B60W 10/06* (2013.01); *B60W 2510/0661* (2013.01); *B60W 2710/024* (2013.01); *B60W 2710/0605* (2013.01); *B60Y 2200/92* (2013.01);
  (Continued)

(58) Field of Classification Search
  USPC .......................... 700/62.265; 701/22, 67, 68
  See application file for complete search history.

(56) References Cited

U.S. PATENT DOCUMENTS 9,321,455 B2 * 4/2016 Kim ...................... B60W 20/40
2010/0312427 A1 * 12/2010 Ueno ..................... B60K 6/365
                                                         701/22

(Continued)

FOREIGN PATENT DOCUMENTS

JP    2006-017042 A    1/2006
JP    2007-083796 A    4/2007

(Continued)

*Primary Examiner* — Thomas Tarcza
*Assistant Examiner* — Richard Goldman
(74) *Attorney, Agent, or Firm* — McDermott Will & Emery LLP

(57) ABSTRACT

An apparatus for controlling an engine clutch of a hybrid vehicle includes an engine for providing driving power of the vehicle through combustion of a fuel, a motor for providing driving power of the vehicle by electric energy, a battery connected to the motor, and providing electric energy to the motor, an engine clutch for selectively connecting the engine and a driving shaft, and a control unit for measuring a real-time engine torque, revising a predetermined release delay time of the engine clutch according to a change rate of the real-time engine torque, and maintaining a lock-up of the engine clutch for the revised release delay time of the engine clutch when a hybrid travelling mode is switched to an electric travelling mode.

10 Claims, 4 Drawing Sheets

(51) Int. Cl.
  *B60K 6/442* (2007.10)
  *B60W 10/02* (2006.01)
  *B60W 10/06* (2006.01)
(52) U.S. Cl.
  CPC ... *B60Y 2300/182* (2013.01); *B60Y 2300/421* (2013.01); *B60Y 2300/43* (2013.01); *B60Y 2400/42* (2013.01); *Y10S 903/914* (2013.01); *Y10S 903/93* (2013.01)

(56) References Cited

U.S. PATENT DOCUMENTS

| | | | | |
|---|---|---|---|---|
| 2014/0343771 | A1* | 11/2014 | Kim | B60W 10/02 701/22 |
| 2015/0039194 | A1* | 2/2015 | Tsukizaki | F16H 61/16 701/57 |
| 2015/0065294 | A1* | 3/2015 | Borntrager | B60T 1/087 477/4 |
| 2015/0344019 | A1* | 12/2015 | Matsui | B60K 6/48 701/22 |
| 2016/0009273 | A1* | 1/2016 | Nagamine | F16H 61/0031 180/65.25 |
| 2016/0059848 | A1* | 3/2016 | Kim | B60W 20/40 701/22 |
| 2016/0107632 | A1* | 4/2016 | Yang | B60W 20/30 701/22 |
| 2016/0121880 | A1* | 5/2016 | Sung | B60W 20/40 477/5 |
| 2016/0244050 | A1* | 8/2016 | Ouchi | B60K 6/48 |

FOREIGN PATENT DOCUMENTS

| | | |
|---|---|---|
| JP | 2007-160991 A | 6/2007 |
| JP | 2007-253780 A | 10/2007 |
| JP | 2011-194940 A | 10/2011 |
| JP | 2013-181554 A | 9/2013 |
| KR | 10-0774671 B1 | 11/2007 |
| KR | 10-2009-0062871 A | 6/2009 |
| KR | 10-1500389 B1 | 3/2015 |
| KR | 10-1583976 B1 | 1/2016 |

* cited by examiner

APPARATUS AND METHOD FOR CONTROLLING ENGINE CLUTCH OF HYBRID VEHICLE

CROSS-REFERENCE TO RELATED APPLICATION

This application claims, under 35 U.S.C. §119(a), the benefit of priority to Korean Patent Application No. 10-2015-0084848, filed on Jun. 16, 2015 with the Korean Intellectual Property Office, the entire contents of which are incorporated herein by reference.

TECHNICAL FIELD

The present disclosure relates to an apparatus and a method of controlling an engine clutch of a hybrid vehicle. More particularly, it relates to a technology of performing a revision of an engine clutch release delay time when a travelling mode of a hybrid vehicle is changed.

BACKGROUND

Due to a global trend of enforcing regulations of exhaust gasses of a vehicle, interest in environmentally-friendly vehicles is high. Vehicle manufacturing companies mass produce environmentally-friendly hybrid vehicles reflecting this interest in environmentally-friendly vehicles.

A hybrid vehicle may be distinguished from a fuel cell vehicle and an electric vehicle in a number of ways, but a hybrid vehicle in the present specification refers to a vehicle adopting an engine and a motor as power sources. That is, the hybrid vehicle has an electric travelling mode that is a motor driving mode for reducing consumption of fuel relative to a hybrid travelling mode that is an engine driving mode. Further, the vehicle may switch between the hybrid travelling mode and an electric travelling mode.

When the hybrid vehicle changes into the electric driving mode, the motor drives the vehicle, so that a release of a connection between the engine, which does not provide driving power, and a driving unit is required. That is, a release control of an engine clutch connecting the engine to the driving unit is performed.

However, vibrations are generated from an engine torque at the time at which the engine torque is converted to 0 in preparation for releasing the engine clutch. Accordingly, there is a problem in that a vibration of the vehicle is generated and an unpleasant driving environment is provided to a vehicle passenger during such a process.

However, when a release of the engine clutch is delayed, fuel is injected in the engine and a fuel driving state is maintained for the delayed time, so there is a problem in that fuel efficiency is reduced due to unnecessary fuel injection.

In order to solve the aforementioned problem, Japanese Patent Application Laid-Open No. 2007-0160991 (hereinafter, "Document 1") that is the prior document provides a technology of detecting a change in demanded driving power by a driver and removing a sense of a travelling mode problem of a user while transiting between travelling modes when a hybrid travelling mode is switched to an electric driving mode.

However, Document 1 cannot provide a technology for revising an engine clutch release delay time by reflecting real-time engine torque information when the engine clutch is released.

In a case where the travelling mode of the hybrid vehicle is transited to the electric travelling mode, when the engine clutch release delay time is set, fuel is unnecessarily injected into the engine, so that there is a problem of a reduction of fuel efficiency.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art, and to provide a technology for performing a revision by reflecting a real-time engine torque to an engine clutch predetermined release delay time when a travelling mode of a hybrid vehicle is transited.

The present disclosure has also been made in an effort to provide a technology for reducing unnecessary fuel injection to an engine and minimizing fuel consumption when a travelling mode is switched from a hybrid travelling mode to an electric travelling mode.

The objects of the present disclosure are not limited to the aforementioned objects, and other non-mentioned objects of the present disclosure may be understood by the description below, and be more clearly appreciated by the exemplary embodiment of the present disclosure. Further, the objects of the present disclosure may be carried out by means represented in the claims and a combination thereof.

In one aspect, the present disclosure provides an apparatus for controlling an engine clutch of a hybrid vehicle, including: an engine for providing driving power of the vehicle through combustion of a fuel; a motor for providing driving power of the vehicle by electric energy; a battery connected to the motor, and for providing electric energy to the motor; an engine clutch for selectively connecting the engine and a driving shaft; and a control unit for measuring a real-time engine torque, revising a predetermined release delay time of the engine clutch according to a change rate of the real-time engine torque, and maintaining a lock-up of the engine clutch for the revised release delay time of the engine clutch when a hybrid travelling mode is switched to an electric travelling mode.

In a preferred embodiment, when the hybrid travelling mode is switched to the electric travelling mode, the control unit may perform a time counter when the engine torque is equal to or less than a predetermined reference torque, and the control unit may release the engine clutch and terminate fuel injection when the counted time is larger than the revised release delay time of the engine clutch.

In another preferred embodiment, the control unit may revise the predetermined release delay time of the engine clutch, and the revision of the release delay time of the engine clutch may include calculating change rates of a real-time engine torque, calculating absolute values of the calculated change rates of the engine torque, and revising the release delay time of the engine clutch according to a moving average value of the calculated absolute values.

In still another preferred embodiment, the predetermined release delay time of the engine clutch may be calculated based on a measurement value of an accelerator position sensor and revolutions per minute of the motor.

In another aspect, the present disclosure provides a method of controlling an engine clutch of a hybrid vehicle, including: comparing an engine torque with a predetermined reference torque when a hybrid travelling mode is switched to an electric travelling mode; performing a time counter when the engine torque is equal to or less than the reference torque; and releasing an engine clutch and terminating fuel injection when the counted time is larger than a release delay time of the engine clutch revised according to a change rate of a real-time engine torque.

In a preferred embodiment, the revised release delay time of the engine clutch may be calculated by revising a predetermined release delay time of the engine clutch, and the calculating for the release delay time of the engine clutch may include calculating change rates of a real-time engine torque, calculating absolute values of the calculated change rates of the engine torque, and revising the release delay time of the engine clutch according to a moving average value of the calculated absolute values.

In another preferred embodiment, the method may further include configuring a look-up table revising the release delay time of the engine clutch according to the moving average value of the calculated absolute values.

In still another preferred embodiment, the method may further include resetting the time counter when the engine torque is equal to or larger than the reference torque.

In yet another preferred embodiment, the method may further include calculating the predetermined release delay time of the engine clutch based on a measurement value of an accelerator position sensor and revolutions per minute of the motor.

In still yet another preferred embodiment, the method may further include configuring the release delay time of the engine clutch calculated based on the measurement value of the accelerator position sensor and the revolutions per minute of the motor in a form of a look-up table.

The present disclosure may achieve the effects by the aforementioned exemplary embodiment and configurations, combinations, and use relationships to be described below.

The present disclosure provides a technology capable of reducing an engine clutch release delay time when a hybrid travelling mode of a hybrid vehicle is switched to an electric travelling mode.

The present disclosure also provides a technology of optimally setting an engine clutch release delay time by reflecting a real-time engine torque and revising the engine clutch release delay time.

It is possible to decrease a fuel injection time of an engine generated when a release of an engine clutch is delayed by minimizing an engine clutch release delay time, thereby improving fuel efficiency.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
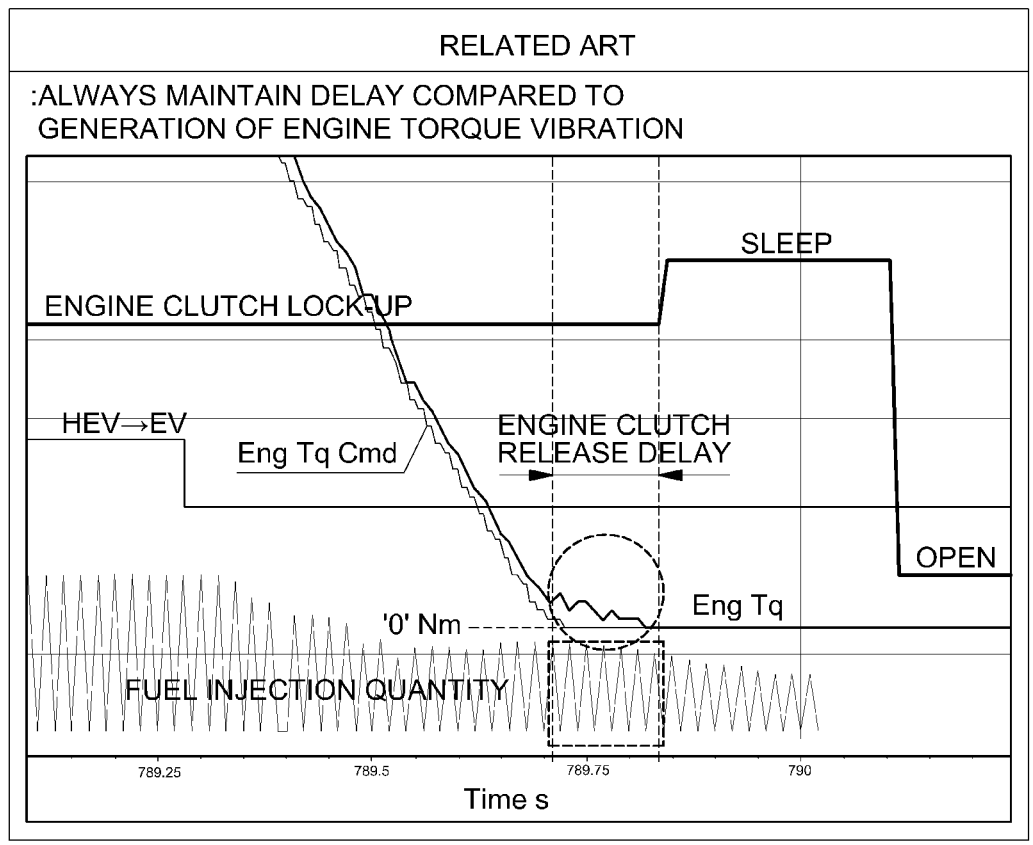
FIG. 1 illustrates an engine clutch release delay time and a fuel quantity injected to an engine for the engine clutch release delay time according to the related art.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, an exemplary embodiment of the present disclosure will be described in more detail with reference to the accompanying drawings. The exemplary embodiment of the present disclosure may be modified in various forms, and the scope of the present disclosure is not interpreted as being limited to the exemplary embodiment described below. The present exemplary embodiment is provided for more completely explaining the present disclosure to those skilled in the art.

In a case where a release of an engine clutch 30 is performed when a hybrid travelling mode of a hybrid vehicle is switched to an electric travelling mode, when a torque of an engine 10 is equal to or less than a predetermined reference torque, there is a problem in that a riding comfort of the vehicle is degraded and vibration is generated in the vehicle due to torque vibrations of the engine 10.

In order to minimize the vibration and a degradation of the riding comfort of the vehicle, a lock-up state between the engine 10 and the engine clutch 30 may be maintained regardless of a driving mode of the vehicle by setting a delay time when the engine clutch 30 is released.

When the travelling mode is switched to the electric travelling mode in a state where the engine clutch 30 is locked with the engine 10, it is possible to decrease vibrations of the vehicle generated due to torque vibrations of the engine 10 generated at a time at which the torque of the engine 10 is 0, and to provide a pleasant driving experience to a passenger of the vehicle. As described above, a time, at which the engine clutch 30 maintains a lock-up state after a torque of the engine 10 is 0 or when a torque of the engine 10 is equal to or less than a predetermined reference torque, is referred to as a release delay time of the engine clutch 30.

However, in a case where the hybrid travelling mode of the hybrid vehicle is switched to the electric traveling mode, when the release delay time of the engine clutch 30 is set regardless of an actual torque value of the engine 10 and a time, and when the engine clutch 30 locks after a torque of the engine 10 is increased, fuel injection to the engine 10 is performed regardless of a driving mode of the vehicle, so that there is a problem in that fuel efficiency decreased when the travelling mode is transited.

Accordingly, the present disclosure provides an apparatus and a method of controlling an engine clutch 30 of a hybrid vehicle, and provides a technology for, when a travelling mode of the hybrid vehicle is switched to an electric travelling mode, controlling a release delay time of the engine clutch 30 based on a real-time torque of an engine 10 to minimize a fuel consumption quantity for the release delay time of the engine clutch 30.

FIG. 1 illustrates a fuel consumption quantity according to a release delay time of an engine clutch 30 when a traveling mode of a hybrid vehicle is switched according to the related art. More particularly, the switch of the travelling mode means a switch from a hybrid travelling mode to an electric travelling mode.

As illustrated in FIG. 1, when the hybrid travelling mode of the vehicle is switched to the electric travelling mode, a release delay time of the engine clutch 30 is set so that the engine clutch 30 maintains a lock-up state, so that the engine clutch 30 is locked up for a predetermined time after a torque of an engine 10 is 0. Further, it is illustrated that the predetermined quantity of fuel is injected to the engine 10 for the release delay time of the engine clutch 30.

Figure 2:
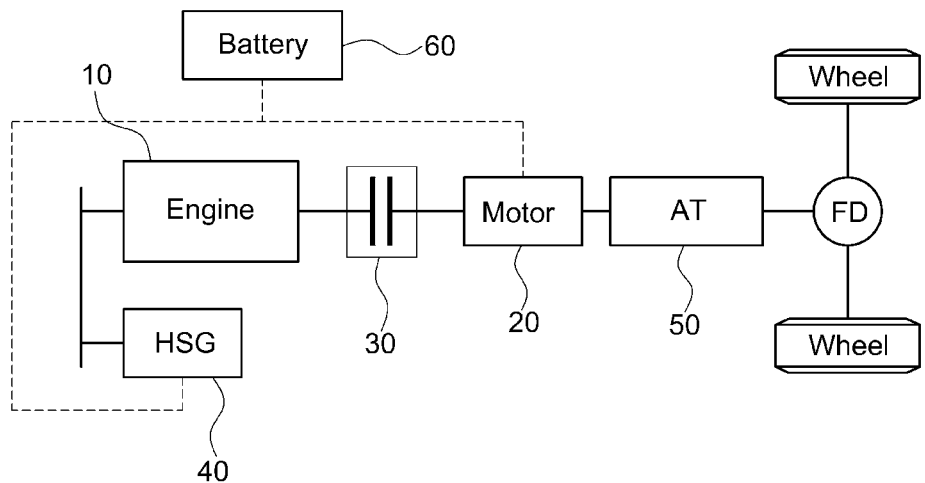
FIG. 2 is a block diagram illustrating a configuration of an apparatus for controlling an engine clutch of a hybrid vehicle.

FIG. 2 illustrates a configuration of an apparatus for controlling an engine clutch 30 of a hybrid vehicle according to an exemplary embodiment of the present disclosure.

In general, a hybrid vehicle includes an engine 10 providing driving power to the vehicle from fuel. Further, the hybrid vehicle includes a motor 20 providing driving power to the vehicle by using electric energy, and has a travelling mode of driving the vehicle by using the fuel in the hybrid travelling mode and driving the vehicle by using the motor 20 in the electric travelling mode. The driving power generated through the engine 10 and the motor 20 is transmitted to wheels through a transmission 50, so that the vehicle can move.

The hybrid vehicle may further include a battery 60 providing electric energy to the motor 20, and the battery 60 may control electric energy provided to the motor 20 according to a state of charge (SOC) of the battery 60 through a control unit.

The hybrid vehicle may further include a hybrid starter generator 40. The hybrid starter generator 40 is a configuration acting as a motor when the engine 10 starts, and serving as a power generator when power generation is required. Accordingly, the hybrid starter generator 40 may be connected with a pulley of the engine 10.

The hybrid starter generator 40 may set a torque of the engine 10 by the control unit, and may measure a real-time torque of the engine 10 and control the torque of the engine 10 through the pulley connected with the engine 10. Further, the control unit may receive a torque amount of the engine 10 and a real-time engine torque change rate through the hybrid starter generator 40 connected with the engine 10, and the control unit receiving the torque amount of the engine 10 and the real-time engine torque change rate may revise a release delay time of the engine clutch 30.

The hybrid vehicle may include the engine clutch 30 connecting the engine 10 with the motor 20 when the hybrid travelling mode of the hybrid vehicle is engaged. When the hybrid vehicle travels in the electric travelling mode, the engine clutch 30 is released and positioned. That is, in the hybrid vehicle performing the electric traveling mode, the engine clutch 30 positioned between the engine 10 and the motor 20 is released, and the hybrid vehicle may travel in a pure electric mode through a single connection of a driving unit and the motor 20. The engine clutch 30 may be positioned between the engine 10 and the driving unit or the engine 10 and the motor 20.

The hybrid vehicle may further include a hybrid control unit (HCU) for setting the hybrid travelling mode or the electric travelling mode of the hybrid vehicle and an engine management system (EMS) for controlling a torque of the engine 10. In the present disclosure, the HCU and the EMS may be configured as the control unit, so that the control unit is used as a concept including each of the HCU and the EMS.

Figure 3:
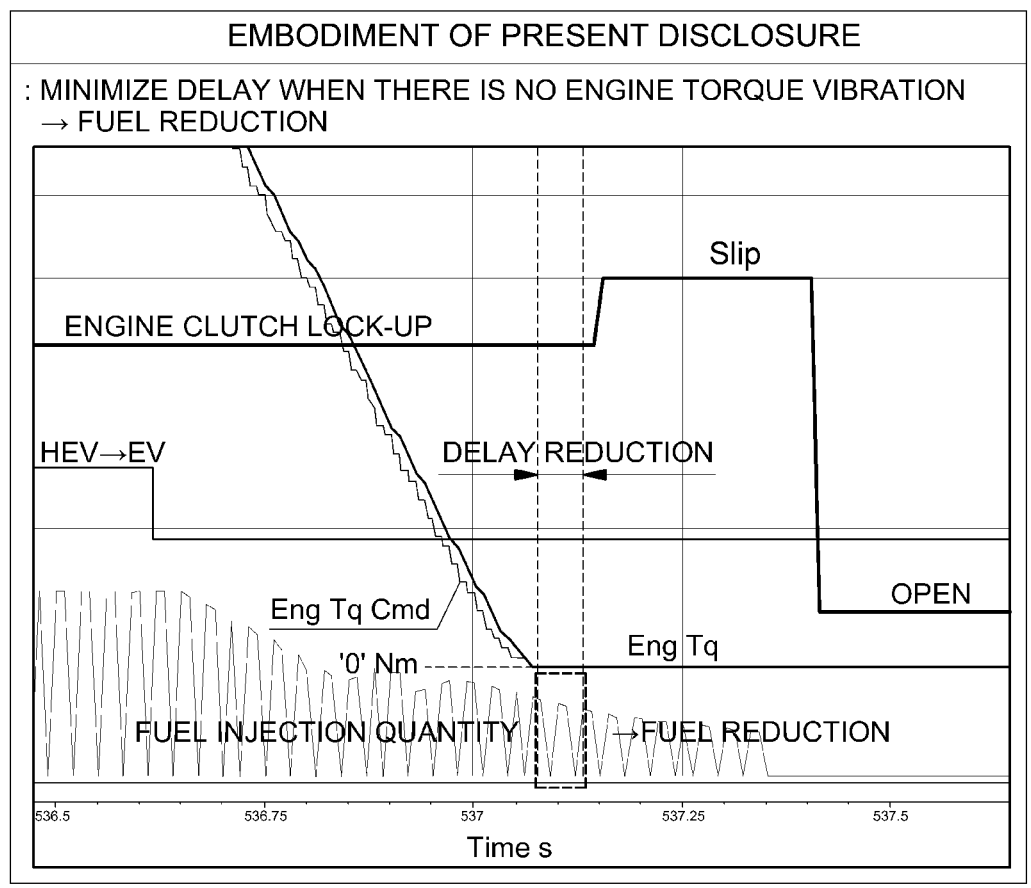
FIG. 3 illustrates a state where an engine clutch release delay time of the present disclosure is decreased, so that a fuel quantity used for the delay time is decreased.

FIG. 3 illustrates a reduction of the release delay time of the engine clutch 30 according to an exemplary embodiment of the apparatus and a method of controlling the engine clutch 30 of the hybrid vehicle of the present disclosure.

As illustrated in FIG. 3, the torque of the engine 10 may be controlled to have a lower torque value than a pre-stored reference torque according to a travelling mode switching request of the hybrid vehicle. More particularly, the torque of the engine 10 may be controlled through the EMS, so that the torque of the engine 10 is decreased to 0. According to the exemplary embodiment of the present disclosure, the torque of the engine 10 is controlled by the hybrid starter generator connected with the pulley of the engine 10, so that the torque of the engine 10 may be controlled to be decreased to 0 through the EMS.

Torque vibrations of the engine 10 are generated at a time when the torque of the engine 10 reaches 0 according to the decrease of the torque of the engine 10. Vehicle vibrations are prevented by setting the release delay time of the engine clutch 30. That is, the present disclosure performs a function of preventing vibrations of the vehicle due to the vibration of the engine 10 by maintaining the lock-up state of the engine clutch 30 even after the torque of the engine 10 actually reaches 0.

In the aforementioned condition, the present disclosure forms the short release delay time of the engine clutch 30, so that the delay time formed by the lock-up of the engine clutch 30 is reduced compared to the related art of FIG. 1. Further, it is illustrated that a fuel injection quantity injected into the engine 10 is decreased according to the reduction of the delay time.

As described above, the release delay time of the engine clutch is set so that the engine clutch 30 is locked-up until the engine clutch 30 is released for preventing vibrations of the vehicle after the torque of the engine is 0. Further, the present disclosure performs a revision of a predetermined release delay time of the engine clutch 30 based on a real-time torque change rate of the engine 10, so that it is possible to calculate an optimal delay time.

As described above, the present disclosure performs the compensation for the predetermined release delay time of the engine clutch 30 based on the real-time torque change rate of the engine 10, so that a revision quantity may be determined by calculating a moving average value of absolute values of the real-time torque change rates of the engine 10. An equation for calculating a revision value according to the real-time torque of the engine 10 is represented below.

$$\text{Revision Value} = \text{Moving Average}\left(\left|\Delta\ Tq = \frac{\text{design torque}}{dt}\right|\right) \quad \text{[Equation 1]}$$

As described above, the revision value is determined by calculating a moving average value based on the absolute values of the real-time torque change rates of the engine 10 so that the control unit may store the calculated revision value in a form of a look-up table. Based on the stored look-up table, the revision is performed with respect to the release delay time of the engine clutch 30 predetermined according to an input value of an accelerator pedal sensor and revolutions per minute (RPM) of the motor 20.

According to the exemplary embodiment of the present disclosure, when the travelling mode of the hybrid vehicle is switched from the hybrid traveling mode to the electric travelling mode, the control unit compares a torque of the engine 10 with a reference torque. When the torque of the engine 10 is equal to or less than the reference torque in the comparison operation, the control unit outputs a time counter, compares the counted time and a revised release delay time D2 of the engine clutch 30, and when the counted time is larger than the revised release delay time D2 of the engine clutch 30, the control unit releases the engine clutch 30 and terminates fuel injection to the engine 10.

As illustrated in FIG. 3, the control unit revises a predetermined release delay time of the engine clutch 30 based on a release delay time of the engine clutch 30 according to the real-time torque of the engine 10, so that the control unit may set an optimal release delay time of the engine clutch 30 according to a real-time torque change rate of the engine 10. Accordingly, it is possible to reduce a time of fuel injection to the engine 10 by reducing an unnecessary release delay time of the engine clutch 30.

Figure 4:
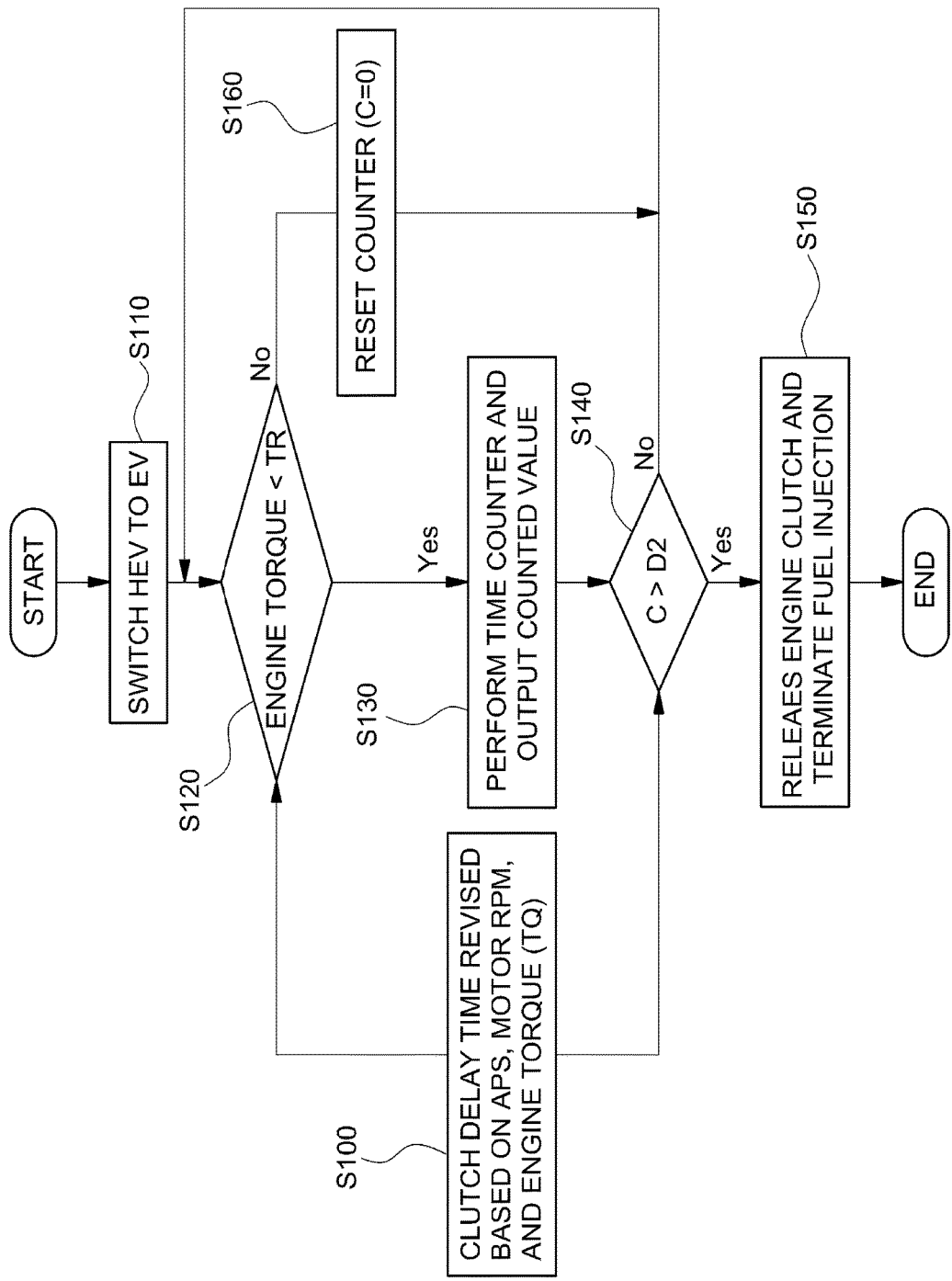
FIG. 4 is a flowchart illustrating a method of controlling an engine clutch of a hybrid vehicle of the present disclosure.

FIG. 4 is a flowchart illustrating a method of controlling the engine clutch 30 of the hybrid vehicle of the present disclosure.

According to an exemplary embodiment of the present disclosure, when the hybrid traveling mode of the hybrid vehicle is switched to the electric travelling mode (S110), the control unit compares a torque of the engine 10 with a predetermined reference torque (S120).

When the torque of the engine 10 measured by the control unit is less than the predetermined reference torque, the control unit performs a time counter, and calculates the counted time (S130). The control unit compares the counted time with a release delay time D2 of the engine clutch 30 revised according to a real-time torque change rate of the engine 10 (S140), so that when the counted time is larger than the revised release delay time D2 of the engine clutch 30, the control unit releases the engine clutch 30 and terminates fuel injection to the engine 10 (S150).

However, when the torque of the engine 10 is larger than the predetermined reference torque, the control unit resets the time counter and re-compares the torque of the engine 10 and the reference torque (S160). Further, when the counted time is less than the release delay time D2 of the engine clutch 30 revised according to the real-time torque of the engine 10, the control unit equally resets the time counter.

When the revised release delay time D2 of the engine clutch 30 is set, the control unit revises the predetermined release delay time of the engine clutch 30. The predetermined release delay time of the engine clutch 30 may generally be set based on an input value of the accelerator pedal sensor and the RPM of the motor 20 (S100). Further, the predetermined release delay time of the engine clutch 30 may be stored in the control unit in the form of the look-up table.

Figure 5:
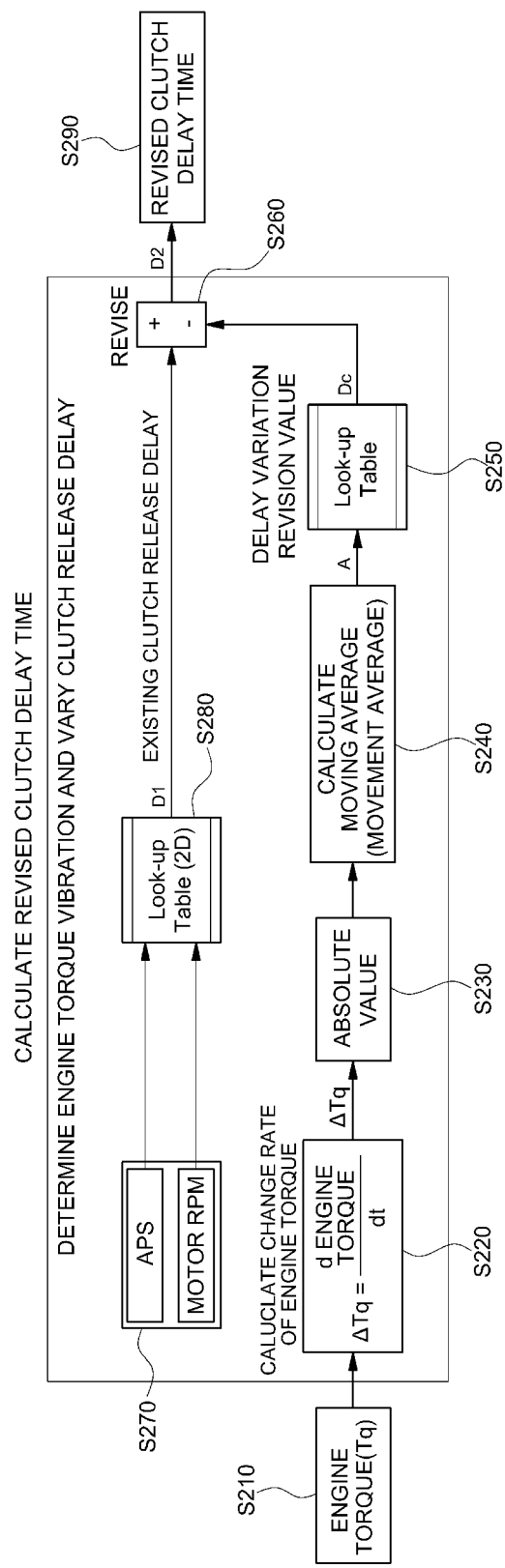
FIG. 5 illustrates a process of calculating a compensated engine clutch release delay time of the present disclosure.

FIG. 5 is a flowchart for revising the predetermined release delay time of the engine clutch 30 according to the real-time torque change rate of the engine 10.

The predetermined release delay time of the engine clutch 30 is stored in the control unit. More particularly, the predetermined release delay time of the engine clutch 30 is set based on the input value of the accelerator pedal sensor and the RPM of the motor 20 (S270), and may be stored in the control unit in the form of the look-up table (S280).

As described above, the present disclosure revises the release delay time of the engine clutch 30 stored in the control unit, so that the revision value is calculated based on the real-time torque of the engine 10 (S210). More particularly, according to the exemplary embodiment of the present disclosure, the control unit may calculate the revision value by calculating the real-time torque change rate of the engine 10 (S220), and calculating a moving average value (S240) of absolute values (S230) of the calculated torque change rates of the engine 10. The calculated revision value may be stored in the control unit in the form of the look-up table (S250).

When the revision value is calculated as described above, the control unit applies the calculated revision value to the predetermined release delay time of the engine clutch 30 (S260) to calculate a revised release delay time of the engine clutch 30 (S290). That is, after the torque of the engine 10 is 0, the lock-up state of the engine clutch 30 is maintained for the revised release delay time D2 of the engine clutch 30.

The above detailed description exemplifies the present disclosure. Further, the aforementioned contents represent and explain the exemplary embodiment of the present disclosure, and the present disclosure may be used in various other combinations, changes, and environments. That is, the present disclosure may be changed or corrected within the scope of the concept of the disclosure disclosed in the present specification, the scope equivalent to the described disclosure contents, and/or the range of technology or knowledge in the art. The described exemplary embodiment describes the best state for implementing the technical spirit of the present disclosure, and various changes demanded in a particular application field and usage of the present disclosure may be available. Accordingly, the detailed description of the disclosure does not intend to limit the present disclosure to the disclosed exemplary embodiment. Further, it should be construed that the accompanying claims include other exemplary embodiments.

What is claimed is:

1. An apparatus for controlling an engine clutch of a hybrid vehicle, comprising:
   an engine for providing driving power of the vehicle through combustion of a fuel;
   a motor for providing driving power of the vehicle by electric energy;
   a battery connected to the motor, and providing electric energy to the motor;

an engine clutch for selectively connecting the engine and a driving shaft; and a control unit for measuring a real-time engine torque, revising a predetermined release delay time of the engine clutch according to a change rate of the real-time engine torque, and maintaining a lock-up of the engine clutch for the revised release delay time of the engine clutch when a hybrid travelling mode is switched to an electric travelling mode.

2. The apparatus of claim 1, wherein when the hybrid travelling mode is switched to the electric travelling mode, the control unit performs a time counter when the engine torque is equal to or less than a predetermined reference torque, and the control unit releases the engine clutch and terminates fuel injection when the counted time is larger than the revised release delay time of the engine clutch.

3. The apparatus of claim 1, wherein the control unit revises the predetermined release delay time of the engine clutch, and the revision of the release delay time of the engine clutch includes calculating change rates of a real-time engine torque, calculating absolute values of the calculated change rates of the engine torque, and revising the release delay time of the engine clutch according to a moving average value of the calculated absolute values.

4. The apparatus of claim 3, wherein the predetermined release delay time of the engine clutch is calculated based on a measurement value of an accelerator position sensor and revolutions per minute of the motor.

5. A method of controlling an engine clutch of a hybrid vehicle, comprising:

comparing an engine torque with a predetermined reference torque when a hybrid travelling mode is switched to an electric travelling mode;

performing a time counter when the engine torque is equal to or less than the reference torque; and releasing an engine clutch and terminating fuel injection when the counted time is larger than a release delay time of the engine clutch revised according to a change rate of a real-time engine torque.

6. The method of claim 5, wherein the revised release delay time of the engine clutch is calculated by revising a predetermined release delay time of the engine clutch, and the revision value of the release delay time of the engine clutch includes calculating change rates of a real-time engine torque, calculating absolute values of the calculated change rates of the engine torque, and revising the release delay time of the engine clutch according to a moving average value of the calculated absolute values.

7. The method of claim 6, further comprising configuring a look-up table revising the release delay time of the engine clutch according to the moving average value of the calculated absolute values.

8. The method of claim 5, further comprising resetting the time counter when the engine torque is equal to or larger than the reference torque.

9. The method of claim 6, further comprising calculating the predetermined release delay time of the engine clutch based on a measurement value of an accelerator position sensor and revolutions per minute of the motor.

10. The method of claim 9, further comprising configuring the release delay time of the engine clutch calculated based on the measurement value of the accelerator position sensor and the revolutions per minute of the motor in a form of a look-up table.

* * * * *